(12) United States Patent
Shulmister, Jr.

(10) Patent No.: US 8,566,775 B2
(45) Date of Patent: Oct. 22, 2013

(54) GRAPHIC RENDERING OF CIRCUIT POSITIONS

(75) Inventor: Joseph David Shulmister, Jr., Plant City, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/350,295

(22) Filed: Jan. 13, 2012

(65) Prior Publication Data
US 2012/0116708 A1  May 10, 2012

Related U.S. Application Data

(62) Division of application No. 12/234,817, filed on Sep. 22, 2008, now Pat. No. 8,136,080.

(51) Int. Cl.
G06F 17/50 (2006.01)
G06F 11/22 (2006.01)

(52) U.S. Cl.
USPC ............................ 716/136; 716/119; 716/126

(58) Field of Classification Search
USPC ......................................... 716/126, 136, 119
See application file for complete search history.

(56) References Cited

U.S. PATENT DOCUMENTS

| | | | |
|---|---|---|---|
| 6,915,499 B1 * | 7/2005 | Teig et al. .................... | 716/129 |
| 7,149,994 B1 | 12/2006 | Dasasathyan et al. | |
| 7,434,192 B2 * | 10/2008 | van Wageningen et al. .. | 716/138 |
| 7,536,665 B1 | 5/2009 | Horlick et al. | |
| 7,631,285 B2 | 12/2009 | Ishikawa | |
| 7,761,836 B1 * | 7/2010 | Wadland et al. .............. | 716/130 |
| 2002/0073393 A1 | 6/2002 | Campbell et al. | |
| 2007/0300198 A1 | 12/2007 | Chaplin et al. | |
| 2010/0164506 A1 | 7/2010 | Fruhauf et al. | |

* cited by examiner

Primary Examiner — Thuan Do
Assistant Examiner — Magid Dimyan

(57) ABSTRACT

A method may include receiving circuit information from a backend circuit test system and grouping components in the circuit information into collections by types, the types including segments, equipment, ports, and connections. The method may further include positioning, based on the grouping by types, the components from the circuit information for presentation of a circuit design on a display, and performing path rendering for the circuit design based on the positioning of the components. The method may also include sending an output file with the path rendering to a web browser.

20 Claims, 11 Drawing Sheets

Column 1     Column 2

Column 1     Column 2

GRAPHIC RENDERING OF CIRCUIT POSITIONS

RELATED APPLICATION

This application is a divisional of U.S. patent application Ser. No. 12/234,817, filed Sep. 22, 2008, the disclosure of which is incorporated by reference herein in its entirety.

BACKGROUND INFORMATION

Transport of network-based services between central offices may be conducted over transport links, often referred to as interoffice facilities (IOFs). An IOF may generically represent any node (or group of nodes) in a telecommunication network and may typically be deployed in synchronous optical networking (SONET) ring topologies of varying size and complexity.

Remote testing of networks may sometimes be initiated using a web browser application connecting (directly or indirectly) to one ore more circuit testing back ends for a service provider's network facilities. In some cases, information about circuits being tested may be presented graphically in the form of a network diagram that is updated as tests progress (for example, by changing element colors to reflect a tested state of equipment). The SONET ring topology of IOF-based networks can present a challenge for browser-based rendering of IOF circuit diagrams.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods for automatically rendering a circuit diagram based on information provided by a backend system, such as a backend interoffice facility (IOF) circuit test system. The systems and/or methods may generate information for an interactive circuit graph that can be viewed on a remote computing device with a web browser. The circuit diagram may be assembled, for example, in a scalable vector graphics (SVG) format. The remote computing device may communicate with backend systems (either directly or indirectly) to update the graphical representation of the components in response to test results.

Figure 1:
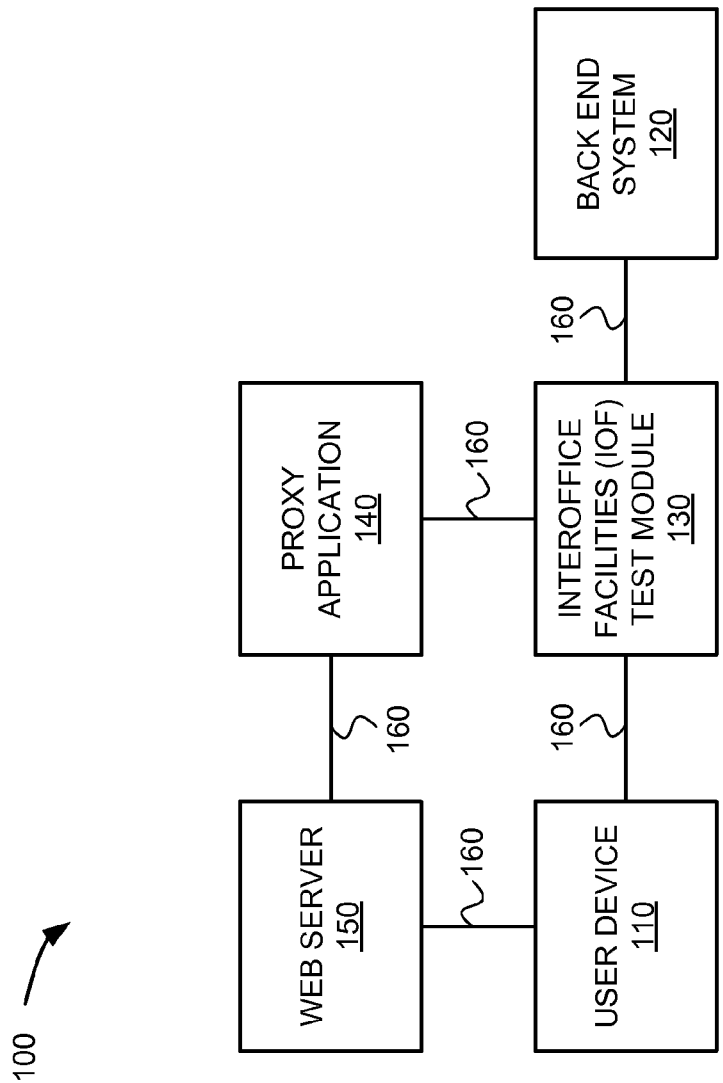
FIG. 1 depicts an exemplary network in which systems and/or methods described herein may be implemented.

FIG. 1 depicts an exemplary network 100 in which systems and/or methods described herein may be implemented. Network 100 may include multiple components that provide circuit test information and render a circuit display to a remote user. As illustrated, network 100 may include a user device 110, a backend system 120, and an interoffice facilities (IOF) test module 130 interconnected by network links 160. Network 100 may optionally include a proxy application 140 and a web server 150. User device 110, backend system 120, IOF test module 130, proxy application 140, and web server 150 may be connected via wired and/or wireless network links 160. A single user device 110, backend system 120, IOF test module 130, proxy application 140, and web server 150 have been illustrated in FIG. 1 for simplicity. In practice, there may be more or fewer user devices, backend systems, test modules, proxy applications, and/or web servers. Also, in some instances, one or more of user device 110, backend system 120, IOF test module 130, proxy application 140, and/or web server 150 may perform one or more functions described as being performed by another one of user device 110, backend system 120, IOF test module 130, proxy application 140, and/or web server 150. Additionally, network links 160 may be part of a single network or multiple networks.

User device 110 may include a personal computer, a laptop, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), or other types of computation or communication devices, threads or processes running on these devices, and/or objects executable by these devices. In one implementation, user device 110 may include any device that is capable of accessing a software application or a web-based application (e.g., provided by web server 150) that enables a user of user device 110 to request, review and/or modify an IOF circuit test.

Backend system 120 may include one or more test modules that may conduct circuit testing of IOF network facilities. In one implementation, backend system 120 may be part of legacy systems that support circuit test operations. Backend system may include information associated with tested components, and may be configured to provide information about particular tests provided to, for example, IOF test module 130. Backend system 120 may provide (e.g., to IOF test module 130) particular circuit information described in terms of tested circuit components and/or component relationships.

IOF test module 130 may include a device that serves a test adapter to backend system 120. IOF test module 130 may compile request information received from user device 110, and may configure a network test based on the compiled request information. IOF test module 130 may receive component information from backend system 120, may generate textual and graphical testing information based on the component information, and may provide the textual and graphical testing information to a user of user device 110. IOF test module 130 may be integrated with a network management system (or another operations support system (OSS)) that allows remote management of network assets across a network infrastructure.

IOF test module 130 may process the circuit information received from backend system 120. As will be described in more detail herein, IOF test module 130 may interpret the circuit information received from backend system 120, and may render graphical representations of a tested network circuit based on the interpreted circuit information. IOF test module 130 may divide circuit components into general types (e.g., segments, equipment, ports, and/or connectors). IOF test module 130 may divide the circuit into logical columns based on the intra connectivity of the circuit segments. In one implementation, IOF test module 130 may provide circuit rendering information directly to user device 110. In another implementation, IOF test module 130 may provide circuit rendering information to user device 110 via other devices, such as proxy application 140 and/or web server 150.

Proxy application 140 may distribute requests for testing from user device 110 to an appropriate test module, such as IOF test module 130. In one implementation, proxy application 140 may reside within web server 150. Proxy application 140 may facilitate communications between the appropriate test module and user device 110. In one implementation, proxy application 140 may include software and/or a combination of hardware and software for directing a test request to an appropriate test module, such as IOF test module 130.

Web server 150 may include a server or a group of servers that facilitate web-based communications (such as hypertext transfer protocol (HTTP) requests) from a user device (such as user device 110) over the Internet. Web server 150 may facilitate communications to user device 110.

Network links 160 may include a local area network (LAN), a wide area network (WAN), a metropolitan area network (MAN), an intranet, the Internet, or a combination of networks. Links 160 may be in the form of a wired and/or wireless connection.

Figure 2:
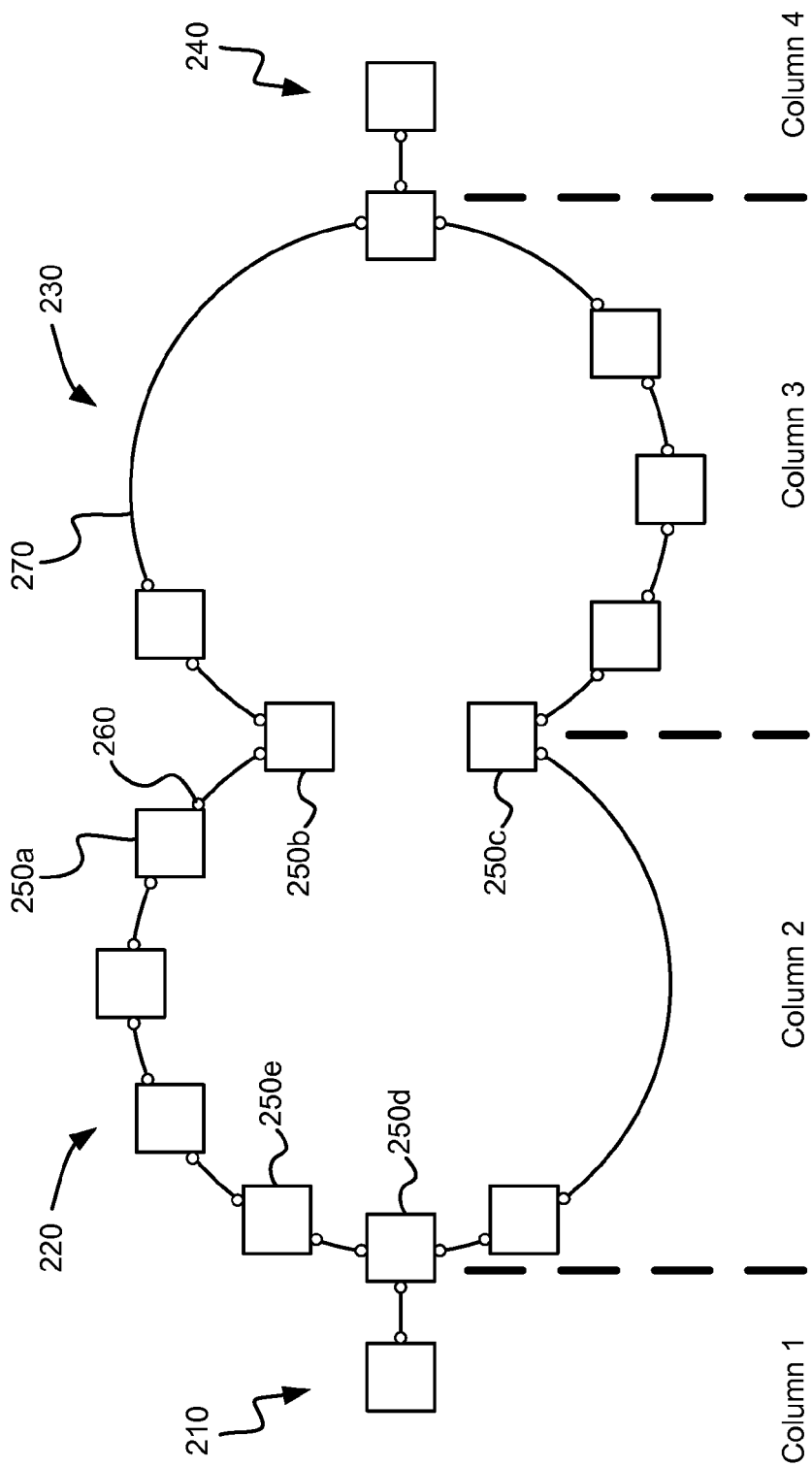
FIG. 2 depicts an exemplary circuit diagram which may be generated using the system and methods described herein.

FIG. 2 depicts an exemplary circuit diagram which may be generated using the systems and/or methods described herein. As shown, the circuit diagram may include segments 210, 220, 230, and 240 that include one or more pieces of equipment, such as exemplary equipment 250a, 250b, 250c, 250d, and 250e (collectively referred to herein as "equipment 250" and generically referred to as a "piece of equipment 250"). Each piece of equipment 250 may include one or more ports, such as an exemplary port 260 (collectively referred to herein as "ports 260" and generically referred to as "port 260"). Connectors 270, such as exemplary connector 270, may join two ports 260. Segments 210, 220, 230, and 240; equipment 250; ports 260; and connectors 270 may be generically and collectively referred to herein as "components."

Circuit components (e.g., a listing of SONET rings, equipment, ports, and/or connectors) may be received from a backend system (such as backend system 120). The circuit components may be divided into segments 210, 220, 230, and 240, with each segment residing in a separate column. A segment may include a group of entities that form, for example, a ring or a linear path. In the example of FIG. 2, four logical columns are shown, where column 1 includes a first segment 210, column 2 includes a second segment 220, column 3 includes a third segment 230, and column 4 includes a fourth segment 240. The column width may be variable, and may be based on the widest segment contained within the column.

Each segment 210, 220, 230, 240 may include multiple pieces of equipment, such as exemplary equipment 250a, 250b, 250c, 250d, 250e. Equipment 250 may include a node in a network, such as, for example, a computer, a router, a switch, or the like. Equipment 250 within each of segments 210, 220, 230, and 240 may be positioned based on flow in the circuit. Equipment 250 may participate in multiple segments. For example, equipment 250b and equipment 250c may be part of segment 220 and segment 230. Ports, such as exemplary port 260, may be positioned on each of the pieces of equipment 250 based on, for example, the segment type where the port is located and positions of connected equipment 250. Generally, a piece of equipment can have multiple ports; however, a port may be associated with only a single piece of equipment. A port, such as port 260, may be associated with a single connector, and a connector may be associated with two ports (one at either end of the connector).

Figure 3:
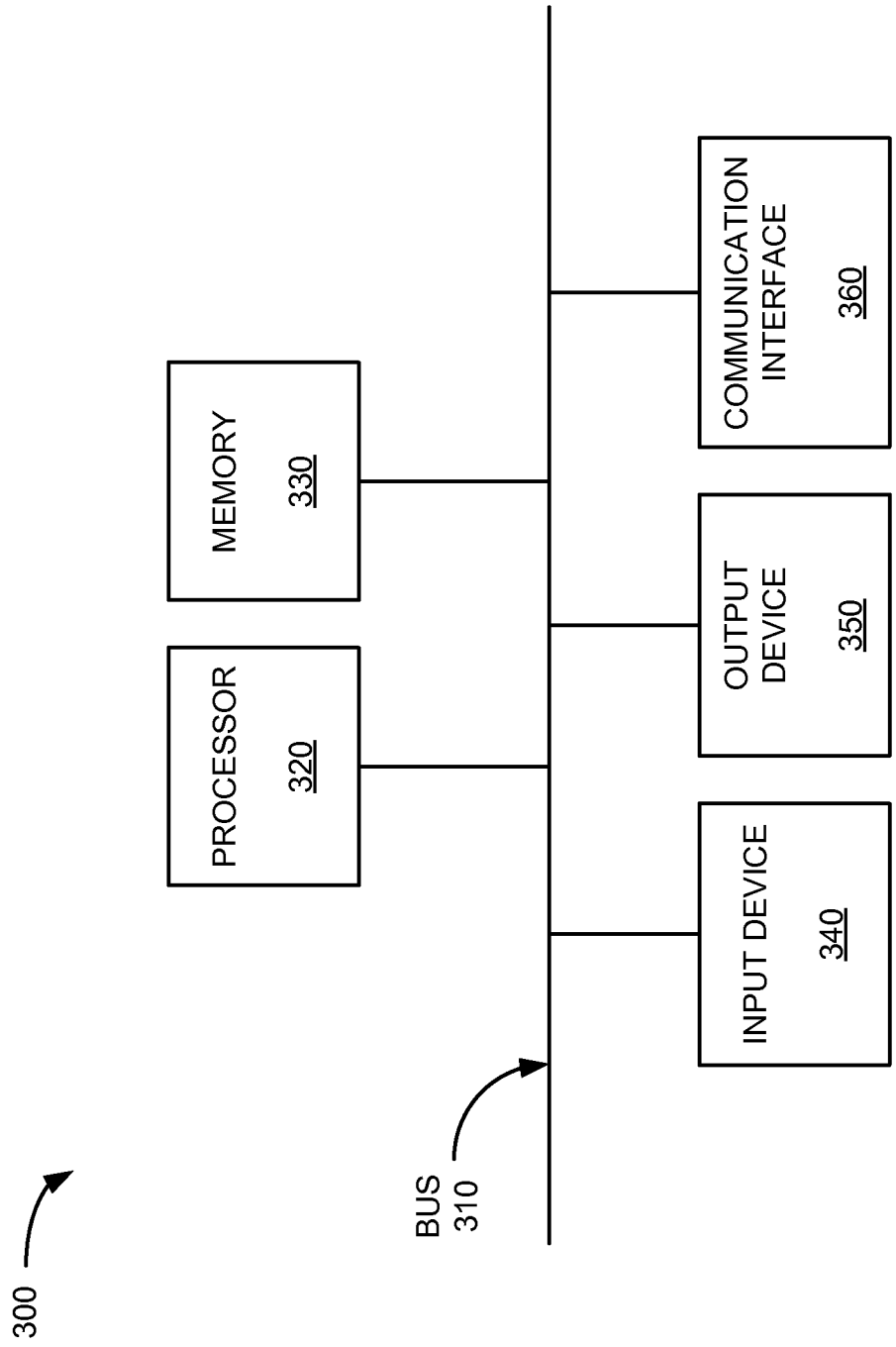
FIG. 3 is a diagram of an exemplary device that may be used in the network of FIG. 1.

FIG. 3 is an exemplary diagram of a device 300 that may correspond to any of user device 110, backend system 120, IOF test module 130, proxy application 140, and/or web server 150. As illustrated, device 300 may include a bus 310, a processor 320, a memory 330, an input device 340, an output device 350, and a communication interface 360. In other implementations, device 300 may include fewer, additional, or different components that aid in receiving, transmitting, and/or processing data. Moreover, other configurations are possible.

Bus 310 may include a path that permits communication among the components of device 300. Processor 320 may include any type of processor or microprocessor that interprets and executes instructions. In other implementations, processor 320 may be implemented as, or include, an application specific integrated circuit (ASIC), a field programmable gate array (FPGA), or the like.

Memory 330 may include a random access memory (RAM) or another type of dynamic storage device that stores information and instructions for execution by processor 320, a read only memory (ROM) or another type of static storage device that stores static information and instructions for the processor 320, and/or some other type of magnetic or optical recording medium and its corresponding drive for storing information and/or instructions.

Input device 340 may include a mechanism that permits an operator to input information to device 300, such as a keyboard, a mouse, a pen, a microphone, voice recognition and/or biometric mechanisms, etc. Output device 350 may include a mechanism that outputs information to the operator, including a display, a printer, a speaker, etc. Communication interface 360 may include any transceiver-like mechanism that enables device 300 to communicate with other devices and/or systems. For example, communication interface 360 may include mechanisms for communicating with another device or system via a network, such as network link 160.

As described herein, device 300 may perform certain operations in response to processor 320 executing software instructions contained in a computer-readable medium, such as memory 330. A computer-readable medium may be defined as a physical or logical memory device. The software instructions may be read into memory 330 from another computer-readable medium, such as a storage device, or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, or additional components than depicted in FIG. 3. In still other implementations, one or more components of device 300 may perform one or more other tasks described as being performed by one or more other components of device 300.

Figure 4:
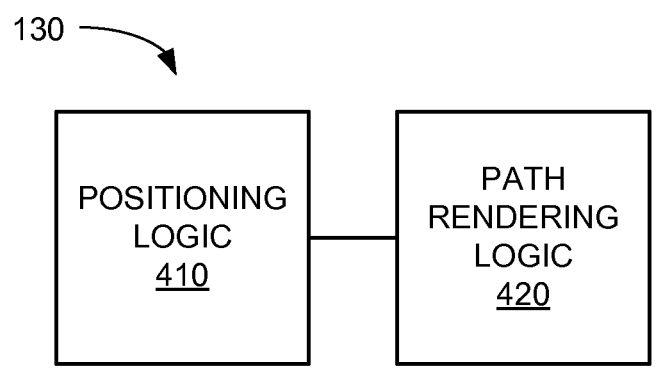
FIG. 4 is a block diagram illustrating exemplary functional components of an interoffice facilities (IOF) test module of FIG. 1.

FIG. 4 provides a block diagram illustrating exemplary components of IOF test module 130 of FIG. 1. In one implementation, IOF test module 130 may include positioning logic 410 and path rendering logic 420. In another implementation, positioning logic 410 and path rendering logic 420 may be distributed among two or more test modules.

Positioning logic 410 may include hardware, software, and/or a combination of hardware and software based logic that performs initial component positioning functions for IOF test module 130. For example, positioning logic 410 may gather component information for the test circuit (e.g., information received from backend system 120) into a collection, may traverse the connectivity of the received components to identify segments (e.g., segments 210, 220, 230, and 240 of FIG. 2), and may layout segments, equipment (e.g., equipment 250 of FIG. 2), ports (e.g., ports 260 of FIG. 2), and connectors (e.g., connectors 270 of FIG. 2) based on their intra connectivity. Positioning logic 410 may perform these tasks with an objective of minimizing overlap and clutter in the presentation of the components.

Path rendering logic 420 may include hardware, software, and/or hardware and software based logic that produces displayable code for the component positions determined by positioning logic 410. For example, path rendering logic 420 may use positions of the segments, equipment, and ports that are output from positioning logic 410 to render SVG-based diagrams. In one implementation, the position of connectors may be driven by the position of their respective ports at either end, and separate position information for connectors may, therefore, not be required. Path rendering logic 420 may work from back to front in the layering of the resultant diagram. For example, path rendering logic 420 may first render connectors, then pieces of equipment, and then ports to an output code. Labels and other information may then be added.

In one implementation, path rendering logic 420 may utilize a strategy of loading graphical "primitives" files for each of basic object types, such as segments, equipment, and ports. Primitives files may include standard attributes for recurring components. The primitives may be indicated with markers in the code, and the markers may be replaced as a matter of rendering the representative objects using the objects' attributes. In another implementation, path rendering logic 420 may include information about graphical structures of components (such as segments, equipment, and ports) directly in the output code. The location and/or attributes of components may be included, for example, in header information with the output code.

Figure 5:
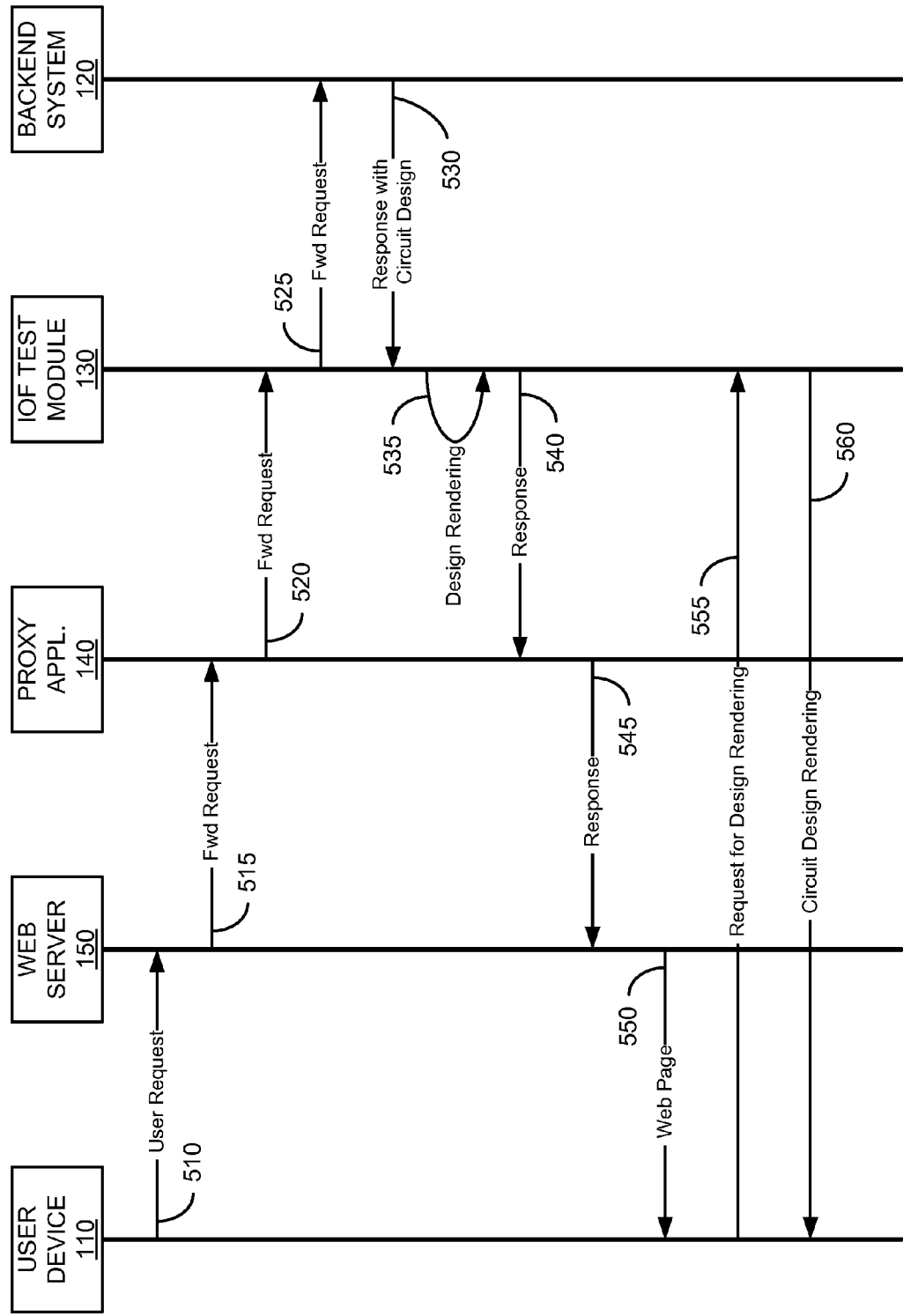
FIG. 5 is a process flow illustrating exemplary operations that may be performed by various components to provide automatic rendering of a circuit diagram.

FIG. 5 provides a process flow illustrating exemplary operations that may be performed by various components of FIG. 1 to provide automatic rendering of a circuit diagram. The process may begin when a user submits a request to initiate or review a test of an IOF circuit. The request may be entered via user device 110 including a web browser.

The user request may be dispatched to web server 150 (line 510). Web server 150 may forward the user request to proxy application 140 (line 515). In one implementation proxy application 140 may be a stand alone executable file; while in another implementation, proxy application 140 may be a local process within web server 150. Proxy application 140 may forward the user request to an appropriate test module (line 520), which is shown in FIGS. 1 and 5 as IOF test module 130. Proxy application 140 may also perform additional processing of the request before forwarding the request to IOF test module 130. In other implementations, proxy application 140 may direct requests to one of a several test modules based on the type of request.

IOF test module 130 may forward the user request to backend system 120 (line 525). The backend system 120 may receive the user request and respond to the request by, for example, initiating testing or providing a status of ongoing testing of the requested circuit. Backend system 120 may gather information about the circuit components and provided a response that includes the circuit design information. The response with the circuit design information may be forwarded to the IOF test module 130 (line 530).

IOF test module 130 may receive the response from backend system 120 and generate a circuit design rendering (line 535). The design rendering (e.g., an SVG format file) may be stored in a local memory cache of IOF test module 130 until requested at a later time. IOF test module 130 may also forward the response from backend system 120 to proxy application 140 (line 540). The forwarded response from IOF test module 130 may also include a reference to the cached design rendering. Proxy application 140 may forward the response (and reference to the cached design rendering) to web server 150 (line 545).

Web server 150 may generate a web page based on the response from backend system 120. The web page may also include the reference to the cached design rendering stored at IOF test module 130. The web page may be sent from web server 150 to user device 110 (line 550). User device 110 may receive the web page and render the page on a display for the user. User device may identify the reference to the cached design rendering and issue a request for the design rendering directly from IOF test module 130 (line 555). IOF test module 130 may respond by providing the cached design rendering to user device 110 (line 560) for user device 110 to display for the user.

Figure 6:
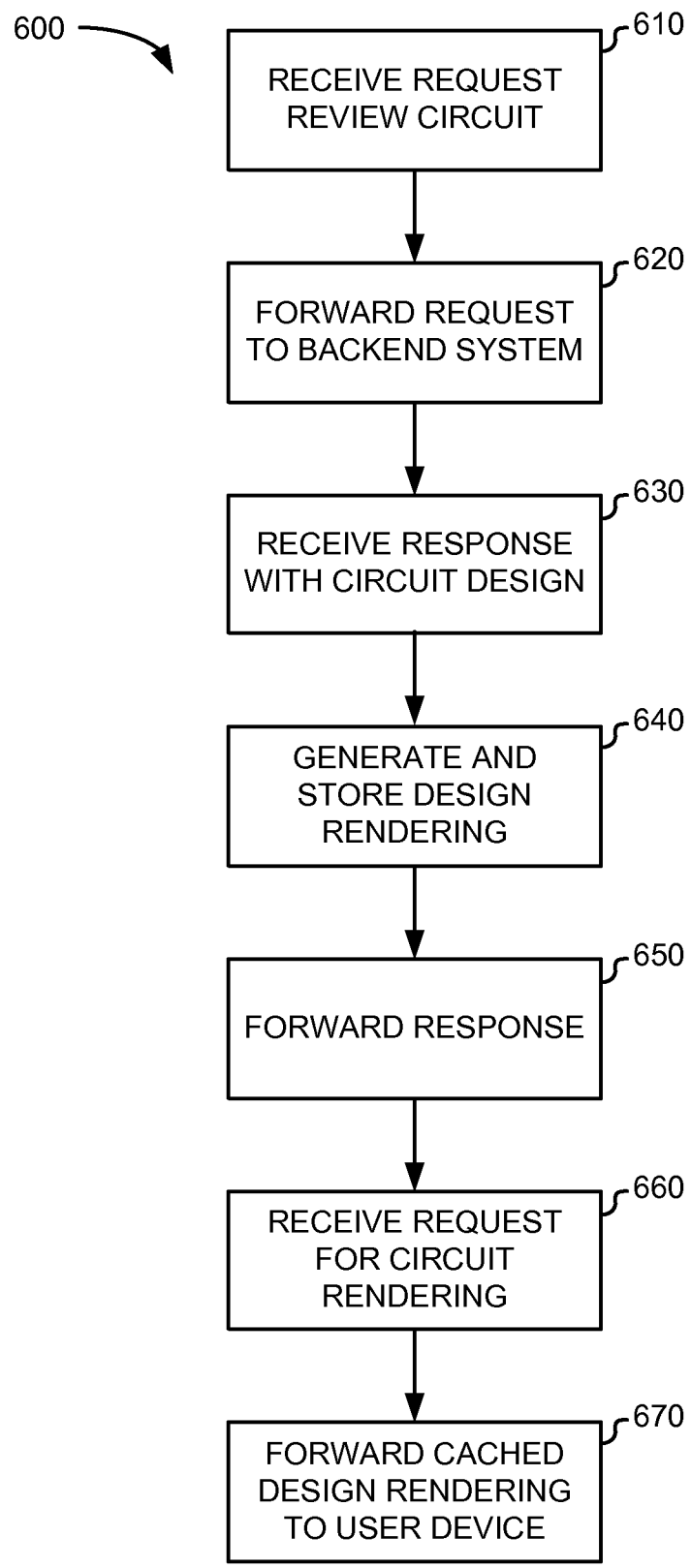
FIG. 6 is a flow chart illustrating exemplary operations performed by the interoffice facilities (IOF) test module of FIG. 1.

FIG. 6 is a flow chart 600 illustrating exemplary operations which may be performed, for example, by IOF test module 130, to provide a circuit rendering for a requested test circuit A request to review a circuit may be received (block 610). For example, a user of user device 110 may initiate a request to open a circuit that may eventually be received by backend system 120. The user's request may be forwarded, for example, via web server 150 and proxy application 140 to IOF test module 130.

The request may be forwarded to a backend system (block 620). For example, IOF test module 130 may forward the request that was initiated at user device 110 to an appropriate backend system, such as backend system 120. Backend system 120 may provide a response, consistent with the request, that includes a circuit design.

A response including a circuit design may be received (block 630). For example, IOF test module 130 may receive a response to the user request and circuit layout information from the backend system, such as backend system 120. The circuit design information may include particular circuit information described in terms of circuit components and component relationships.

A design rendering may be generated and stored (block 640). For example, IOF test module 130 may generate a graphic circuit rendering based on the information received from backend system 120. The design rendering may be stored in a cache (such as, for example, memory 330 of FIG. 3) for later retrieval. Additional details of component positioning are described below in connection with FIG. 6.

The response may be forwarded (block 650). For example, IOF test module 130 may forward the response from backend system 120 to user device 110. In one implementation, IOF test module 130 may forward the response from backend system 120 via web server 150 and/or proxy application 140.

A request for circuit rendering may be received (block 660). For example, IOF test module 130 may receive a request for a circuit rendering relating to the response from backend system 120 that was provided in block 650. In one implementation, the request may come directly from user device 110. In another implementation, the request for circuit rendering may be forwarded via one or more intermediate modules, such as web server 150 and/or proxy application 140.

The design rendering may be sent to a user (block 670). For example, IOF test module 130 may provide the circuit design rendering in the form of a SVG file to a user device that includes a web browser, such as user device 110. The circuit design rendering may be retrieved from memory (e.g., memory 330) of IOF test module 130. In one implementation, the SVG file may be provided directly (e.g., via a network link 160) from IOF test module 130 to user device 110. In another implementation, the SVG file may be provided through one or more intermediate modules, such as a web server 150 and/or a proxy application 140.

Figure 7:
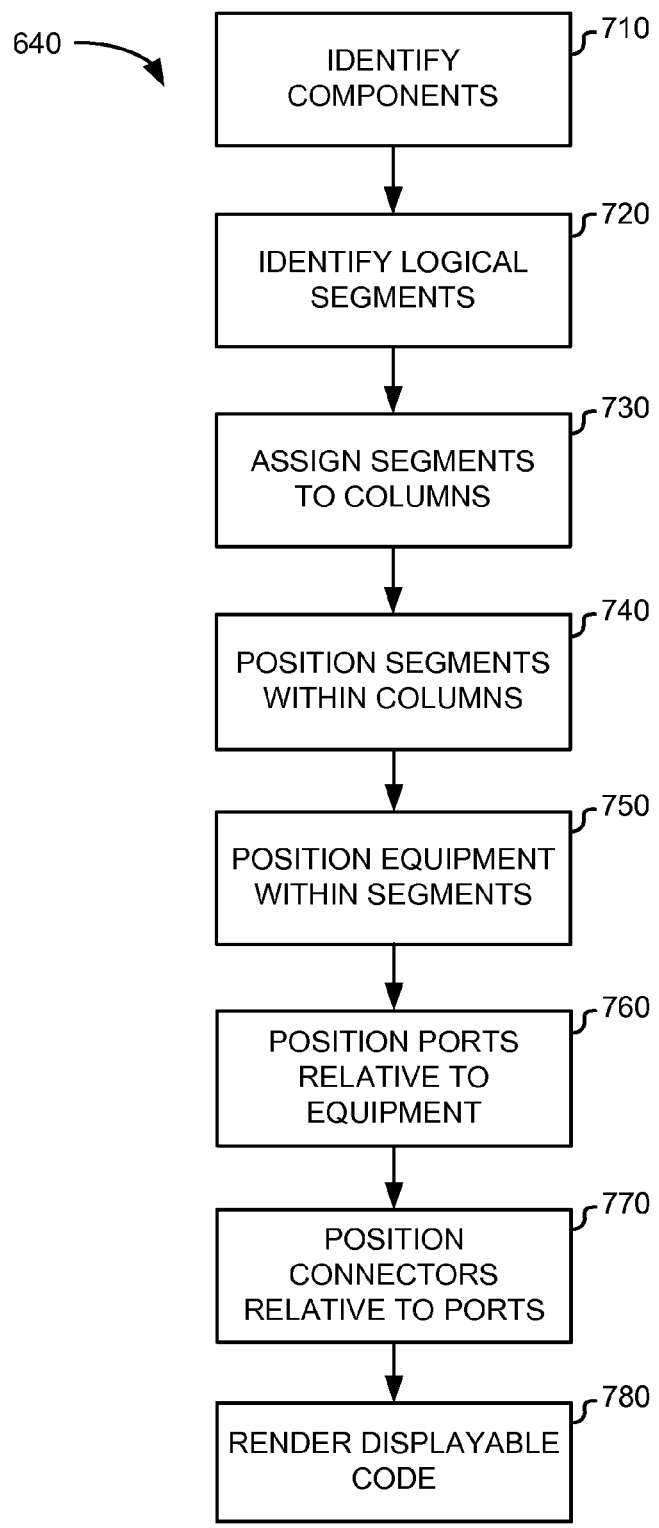
FIG. 7 is a flow chart illustrating exemplary operations for positioning components.

FIG. 7 is a flow chart illustrating exemplary operations for generating the circuit design rendering of block 640 of FIG. 6. As shown in FIG. 7, components may be identified (block 710). For example, positioning logic 410 may retrieve all components from the network design and may place them in a local collection. Each component may be identified and an appropriate type (e.g., segment, equipment, port, or connection) constructed for each component. Thus, the overall circuit may be simplified into a limited number of component types that may be presented to a user.

Logical segments may be identified (block 720). For example, positioning logic 410 may follow the interconnectivity of the components in sequence to identify logical segments. Segments can be determined to be directly connected to other segments based on the segments having shared equipment. Thus, a logical tree-like graph of multiple segments may be created.

Segments may be assigned to columns (block 730). For example, positioning logic 410 may work sequentially (e.g., in a left-to-right direction from the first segment), using interconnectivity of the segments to assign each segment to a logical column.

Segments may be positioned within each column (block 740). For example, positioning logic 410 may address each logical column to position each segment within a column. One approach to assigning segments to columns may be to use a width-first n-array tree (e.g., where each node in the array tree may have zero to n child nodes) traversal based on the connectivity of each of the segments. For example, a segment ("segment 1") in a first column may be connected to two other segments ("segment 2" and "segment 3"). Segment 2 and segment 3 could be assigned to a second column. Other segments directly connected to segment 2 and segment 3 could be assigned to a third column, and so on.

Figure 8A:
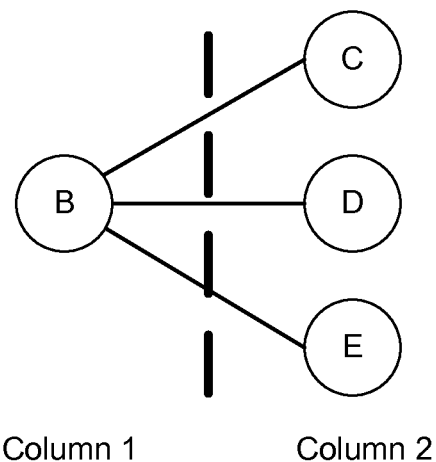
FIGS. 8A and 8B are schematic diagrams illustrating segment positioning within logical columns according to an implementation of FIG. 6.
Figure 8B:
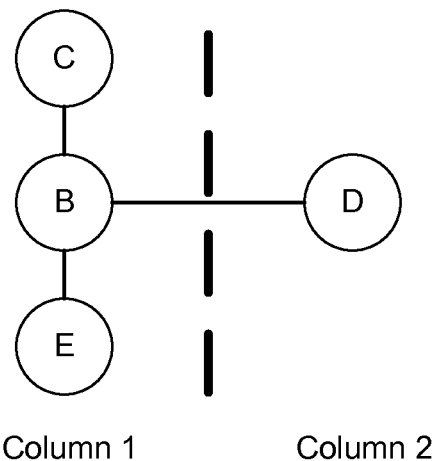

In one implementation, positioning of segments within columns may be optimized according to a rule set that can advance a segment from its assigned column to the preceding column (e.g., moving the segment from right to left in a display). If a segment is not connected to any segments other than its precedent segment, and it is either the last or first connected segment to its precedent segment, then the segment may be placed in the precedent segment's column immediately above (if it is the first connected segment) or immediately below (if it is the last connected segment) the precedent segment. FIGS. 8A and 8B are schematic diagrams that illustrate column optimization. For example, referring to FIG. 8A, segment B may be in column 1 and may be connected to segments C, D, and E. The default arrangement may be that segments C, D, and E would be placed in column 2. However, as shown in FIG. 8B, if segment C is not connected to anything else, then segment C can be moved to column 1 immediately above segment B. Similarly, if segment E is not connected to anything else, than segment E can be moved to column 1 immediately below segment B.

Equipment may be positioned within each segment (block 750). For example, positioning logic 410 may assign each piece of equipment to a location on a segment. Equipment position within a segment may be based on path node definitions received from backend system 120 (e.g., the relative order of the equipment may be maintained). While a default arrangement may be to orient equipment within a SONET ring in a clockwise orientation, a counterclockwise orientation may be used to prevent crossed connections when possible, while maintaining the same logical relative order of the equipment.

Because each port belongs to exactly one segment, port information may be used to determine how equipment may be associated with multiple segments. Equipment, by virtue of potentially having many ports, may participate in the segments of their ports (and thus, a particular piece of equipment can participate in one or more segments). Thus, segment participation by equipment may be determined by the ports of the equipment.

If the relative order of the equipment permits, equipment on a ring may be evenly distributed around the ring. However, the number of pieces of equipment on an east side of a path may not match the number of pieces of equipment on a west side of the path. Thus, equipment that is unique to a ring may be distributed evenly between pieces of equipment of the ring that are shared with other equipment. In some implementations, fake (or non-visible) elements may be used to force equipment into better-distributed positions around a ring.

Returning to FIG. 7, ports for each piece of equipment may be positioned relative to the equipment (block 760). For example, positioning logic 410 may position ports for each piece of equipment. Ports may be placed so that they are on the "best" edge of the equipment when considering the position of the equipment to another piece of connected equipment. The best edge may generally be considered the edge that allows for a connection line (from one piece of equipment to another) to be drawn directly with minimal overlap of other components. For example, referring to FIG. 2, if equipment 250e is connected to equipment 250d, and equipment 250e is above equipment 250d, the best edge for the bottom port may be the top side of equipment 250d, while the best edge for the top port may be the bottom side of equipment 250e.

Connectors may be positioned relative to ports (block 770). For example, IOF test module 130 may position each connector between the respective two ports associated with the connector. Because the port positions may have already been oriented to minimize overlap of connectors, connector positioning may include specifying an arc path between a starting port and an ending port for each connector.

Displayable code may be rendered (block 780). The displayable code may be based on the positioning performed by positioning logic 410. For example, IOF test module 130 may use the positioning output derived in the previous block (e.g., block 710 through 770) to produce displayable code of, for example, an SVG-based diagram. IOF test module 130 may logically work backwards in layering the resultant diagram.

The SVG rendering may include a collection of scripting language methods (such as ECMAScript) for manipulating the display of the SVG diagram or responding to events on the SVG diagram components (such displaying additional information when a user moves a cursor over a piece of equipment). The scripting language methods may communicate across document boundaries, and may call methods outside the rendering file to allow updates to external HTML (hyper text markup language) DOM (document object model) elements. The HTML DOM elements may communicate into the SVG DOM to do such things as change color of components in response to test results. Additional details of path rendering are described below in connection with FIG. 8.

Figure 9:
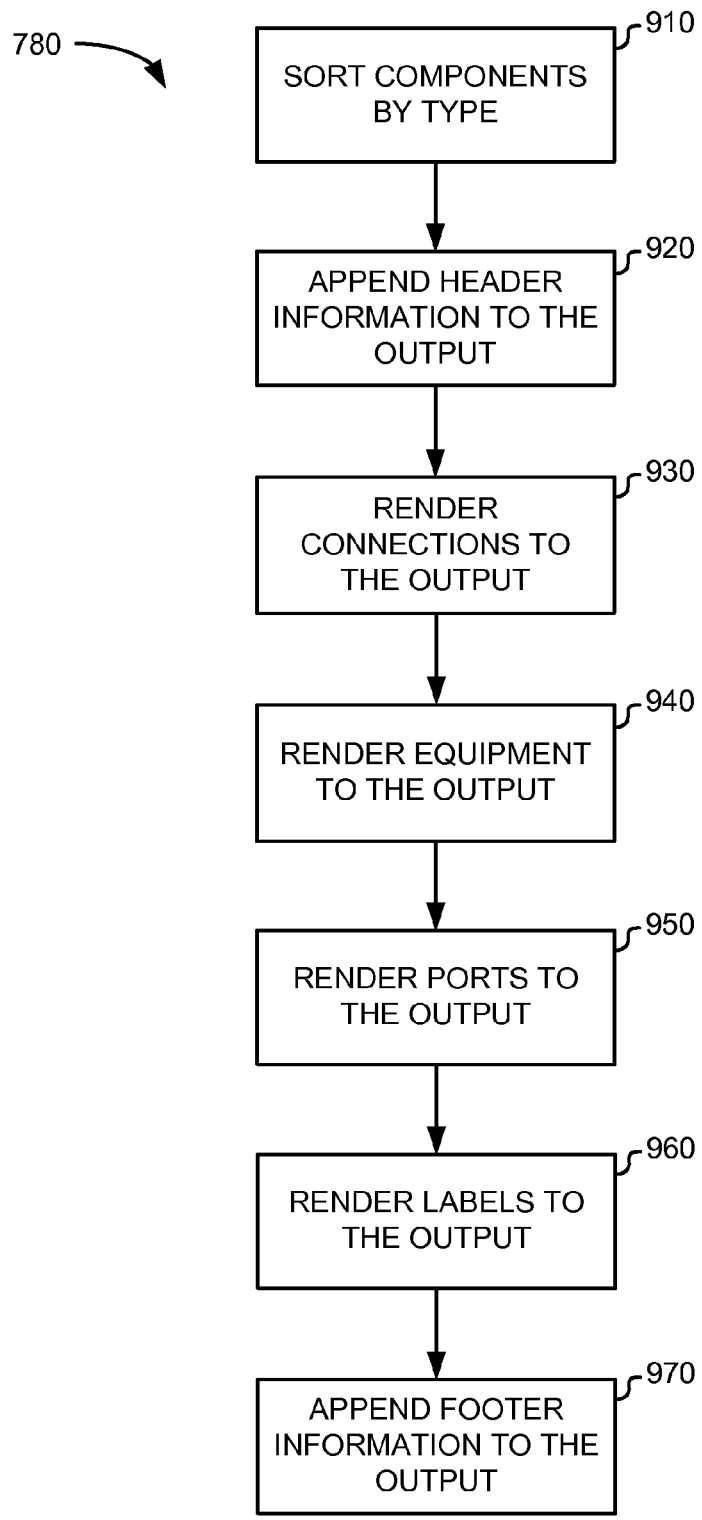
FIG. 9 is a flow chart illustrating exemplary operations for performing path rendering.

FIG. 9 is a flow chart illustrating exemplary operations for performing path rendering of block 780 of FIG. 7. As shown, components may be sorted by type (block 910). For example, path rendering logic 420 of IOF test module 130 may gather components into collections by type (e.g., segments, connectors, equipment, and ports).

Header information may be appended to the output (block 920). For example, path rendering logic 420 may append header information to the output code. Header information may include, for example, definitions or macro definitions of SVG objects used to represent components (e.g., segments, equipment, and ports) that may be used repeatedly. For example, information in the header may indicate a piece of equipment may be defined by the shape of a rectangle with a particular arrangement of stripes and/or arrows inside the rectangle.

Connectors may be rendered to the output (block 930). For example, path rendering logic 420 may render connectors to the output code. In specifying an arc in a path, instructions can provide coordinates (such as X and Y position coordinates), including a start-x position, a start-y position, an x-radius, a y-radius, an x-axis-rotation, a large-arc-flag, a sweep-flag, an end-x position, and an end-y position of the figure. The large-arc-flag and the sweep-flag may combine to determine which way an arc will go in traversing the start/end points, and whether the arc is relatively convex or concave.

Equipment may be rendered to the output (block 940). For example, path rendering logic 420 may render equipment to the output code. As noted above, in one implementation, equipment structures may be defined in header information and may be called out later in the output code.

Ports may be rendered to the output (block 950). For example, path rendering logic 420 may render ports to the output code. Labels may be rendered to the output (block 960). For example, path rendering logic 420 may render labels to the output for each type collection. Labels may also include particular names for node locations and/or equipment as provided by a backend system, such as backend system 120.

Footer information may be appended to the output (block 970). For example, path rendering logic 420 may append footer information to the output code. Footer information may include presentation information that may be specific to the SVG display, such as, for example, backing and framing for pop up messages.

Figure 10:
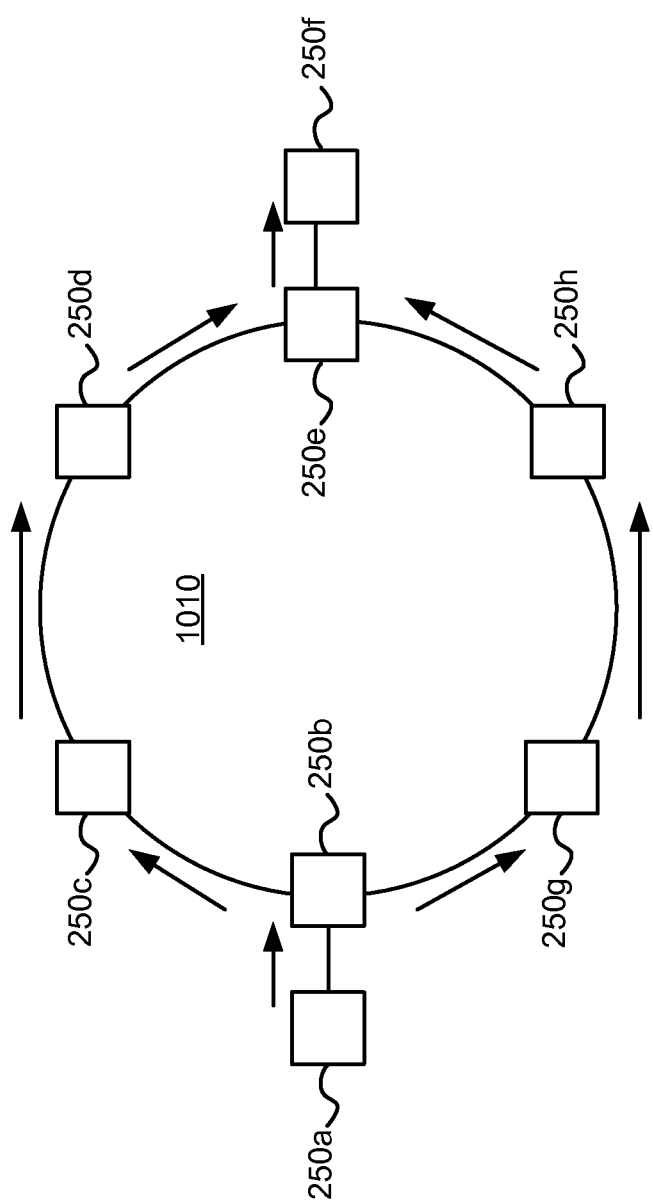
FIG. 10 is an exemplary schematic for identifying circuit segments according to implementations described herein.

FIG. 10 provides an exemplary schematic for identifying segments (such as ring segments and line segments) according to systems and/or methods described herein. As shown in FIG. 10, the schematic may include equipment 250*a*, 250*b*, 250*c*, 250*d*, 250*e*, 250*f*, 250*g*, and 250*h* with connections. Equipment 250*a* and 250*b* may be connected by a linear connection. Equipment 250*e* and 250*f* may be connected by a linear connection. Equipment 250*b*, 250*c*, 2150*d*, 250*e*, 250*g*, and 250*h* may be connected to form a ring 910. As indicated in FIG. 10, the connections may progress outward from the left side of FIG. 10 to the right, without looping back around ring 1010. Ring 1010 may be determined by traversing equipment 250*b*, 250*c*, 250*d*, and 250*e*; and then on a second pass, adding equipment 250*g* and 250*h* to ring 1010, but in a reverse order. Ring 1010 may be identified as equipment 250*b*, 250*c*, 250*d*, 250*e*, 250*h*, and 250*g*.

Figure 11:
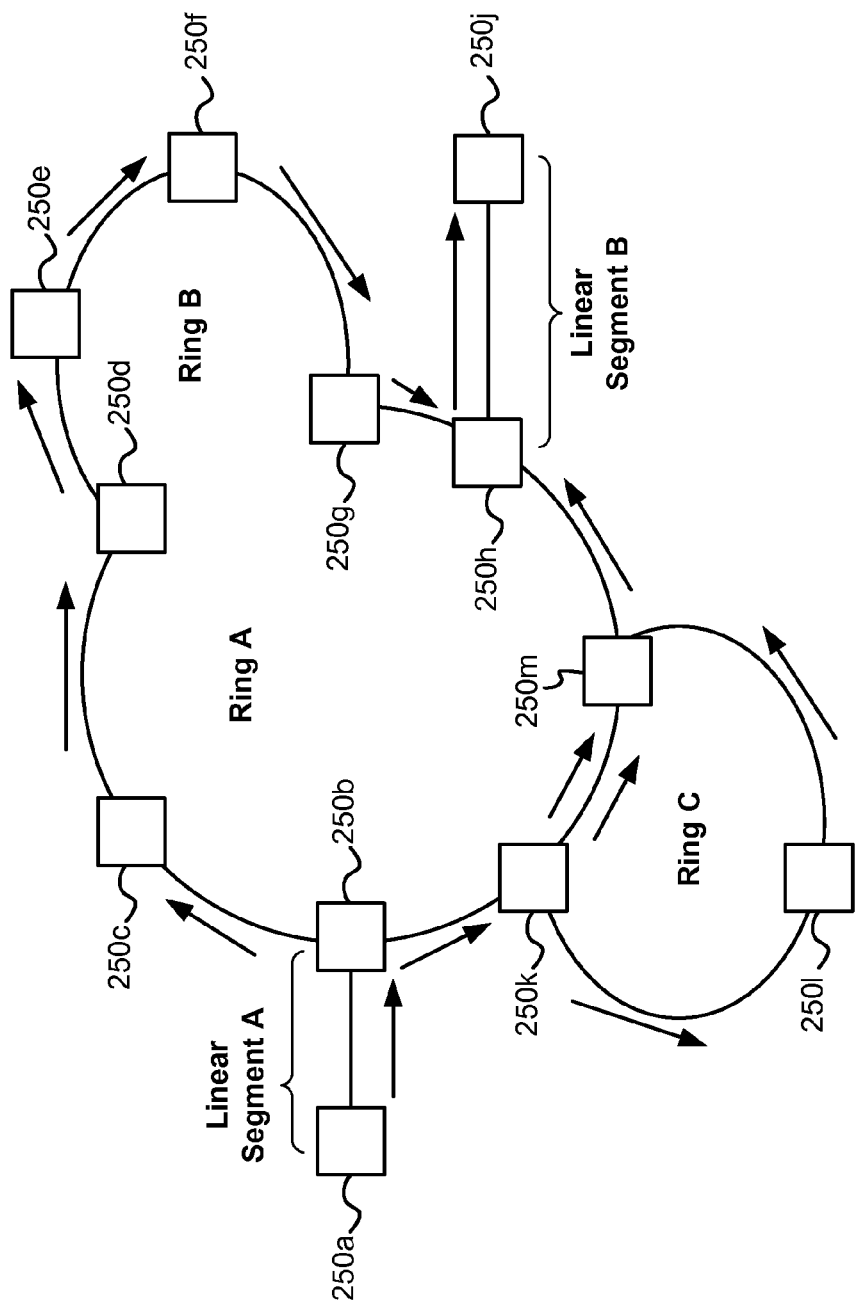
FIG. 11 is another exemplary schematic for identifying circuit segments according to implementations described herein.

FIG. 11 provides another exemplary schematic for identifying a segment according to systems and/or methods described herein. In contrast to the determination of FIG. 10, FIG. 11 provides a more complicated scenario. A processing module, such as IOF test module 130, may create a dual collection of equipment based on the direction in which the traversal is progressing.

As shown in FIG. 11 the schematic may include equipment 250*a*, 250*b*, 250*c*, 250*d*, 250*e*, 250*f*, 250*g*, 250*h*, 250*j*, 250*k*, 250*l*, and 250*m* with connections. The logic flow for identifying linear segments and ring segments may be as follows.

1. Equipment 250*a* may be part of linear segment A; and equipment 250*a* may be added to a "Linear Segment A" collection.
2. Equipment 250*b* may be part of linear segment A; and equipment 250*b* may be added to the "Linear segment A" collection.
3. Equipment 250*b* may include a "split." The clockwise direction may be processed first, and equipment 250*b* may be queued for reprocessing (to process the other connections).
4. Equipment 250*b* may be part of SONET Ring A; and equipment 250*b* may be added to a "Ring A—forward" collection.
5. Equipment 250*c* may be part of SONET Ring A; and equipment 250*c* may be added to the "Ring A—forward" collection.
6. Equipment 250*d* may be part of SONET Ring A; and equipment 250*d* may be added to the "Ring A—forward" collection.
7. Equipment 250*d* may be part of SONET Ring B; and equipment 250*d* may be added to a "Ring B—forward" collection.
8. Equipment 250*e* may be part of SONET Ring B; and equipment 250*e* may be added to the "Ring B—forward" collection.
9. Equipment 250*f* may be part of SONET Ring B; and equipment 250*f* may be added to the "Ring B—forward" collection.
10. Equipment 250*g* may be part of SONET Ring B; and equipment 250*g* may be added to the "Ring B—forward" collection.
11. Equipment 250*g* may be part of SONET Ring A; and equipment 250*g* may be added to the "Ring A—forward" collection.
12. Equipment 250*h* may be part of SONET Ring A; and equipment 250*h* may be added to the "Ring A—forward" collection.
13. Equipment 250*h* may be part of linear segment B; and equipment 250*h* may be added to a "Linear Segment B" collection.
14. Equipment 250*j* may be part of linear segment B; and add equipment 250*j* may be added to the "Linear Segment B" collection.
15. Having reached the end of the circuit; the process may return to the reprocessing queue (which contains equipment 250*b* from step 3 above).
16. Because equipment 250*b* may be already in the "Ring A—forward" collection, the "Ring A—forward" collection may be closed. The next equipment in the counterclockwise path from equipment 250b may be appended to a "Ring A—backward" collection.

17. Equipment 250k may include a "split." The clockwise direction may be processed first, and equipment 250k may be queued for reprocessing (to process the other connections).
18. Equipment 250k may be part of SONET Ring A; and equipment 250k may be added to the "Ring A—backward" collection.
19. Equipment 250m may be part of SONET Ring A; and equipment 250m may be added to the "Ring A—backward" collection.
20. Equipment 250h may already be in the "Ring A—forward" collection; so processing of Ring A may be stopped. The process may return to the reprocessing queue (which may currently contain equipment 250k from step 17 above).
21. Equipment 250k may include another "split." The clockwise direction may be processed first, and equipment 250k may again be queued up for reprocessing (to process the other connections).
22. Equipment 250k may be part of SONET Ring C; and equipment 250k may be added to a "Ring C—forward" collection.
23. Equipment 250m may be part of SONET Ring C, and equipment 250m may be added to the "Ring C—forward" collection.
24. Equipment 250m may already be in the "Ring A—backward" collection, and equipment 250m may include no outbound splits. Forward processing may be stopped and the process may go back to the reprocessing queue (which contains equipment 250k from step 21 above).
25. Because equipment 250k may already be in the "Ring C—forward" collection, the "Ring C—forward" collection may be closed. Subsequent equipment may be appended to a "Ring C—backwards" collection.
26. Equipment 250l may be part of SONET Ring C, and equipment 250l may be added to the "Ring C—backward" collection.
27. Equipment 250m may already be fully processed, there may be no remaining queued equipment, and the process may be completed.

The above logical steps may provide collections of Linear Segment A (equipment 250a, equipment 250b), Linear Segment B (equipment 250h, equipment 250j), Ring A—Forward (equipment 250b, equipment 250c, equipment 250d, equipment 250g, equipment 250h), Ring A—Backward (equipment 250k, equipment 250m), Ring B—Forward (equipment 250d, equipment 250e, equipment 250f, equipment 250g), Ring B—Backward (empty), Ring C—Forward (equipment 250k, equipment 250m), and Ring C—Backward (equipment 250l). After reconciling the forward and backward collections into single clockwise-oriented collections, the resultant sets may be Linear Segment A (equipment 250a, equipment 250b), Linear Segment B (equipment 250h, equipment 250j), Ring A (equipment 250b, equipment 250c, equipment 250d, equipment 250g, equipment 250h, equipment 250m, equipment 250k), Ring B (equipment 250d, equipment 250e, equipment 250f, equipment 250g), and Ring C (equipment 250k, equipment 250m, equipment 250l).

Systems and/or methods described herein may allow for automatically rendering a circuit diagram based on information from a backend system, such as a backend interoffice facility (IOF) circuit test system. The circuit diagram may be used in a remote interface to track tests operations using a remote computing device, such as a web browser.

The foregoing description provides illustration and description, but is not intended to be exhaustive or to limit the embodiments to the precise form disclosed. Modifications and variations are possible in light of the above teachings or may be acquired from practice of systems and methods disclosed herein.

Also, while series of blocks and/or lines have been described with regard to the flowchart of FIGS. 5, 6, 7, and 9, the order of the blocks and/or lines may differ in other implementations. Further, non-dependent acts may be performed in parallel.

Implementations described herein may be implemented in methods and/or computer program products. Accordingly, implementations may be embodied in hardware and/or in software (including firmware, resident software, micro-code, etc.). Furthermore, implementations described herein may take the form of a computer program product on a computer-usable or computer-readable storage medium having computer-usable or computer-readable program code embodied in the medium for use by or in connection with an instruction execution system. The actual software code or specialized control hardware used to implement the systems and methods described herein is not limiting. Thus, the operation and behavior of the implementations were described without reference to the specific software code—it being understood that software and control hardware could be designed to achieve implementations based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A device comprising:
   a communication interface to receive circuit test information,
   the circuit test information including information identifying components of a tested circuit and one or more component relationships of the tested circuit; and
   a processor to:
   traverse connectivity associated with the components;
   identify one or more segments of the tested circuit;
   define one or more logical columns for a graphical display of the circuit test information based on the one or more segments;
   optimize at least one of the one or more segments in a logical column, of the defined one or more logical columns, according to a rule set that includes a rule that advances a segment, of the one or more segments, from a default column to a preceding column;

layout, based on the traversed connectivity, the one or more logical columns, and the optimized at least one of the one or more segments, the one or more segments; and send a graphic rendering of the tested circuit, via the communications interface, to another device.

2. The device of claim 1, where each of the one or more segments includes a linear segment or a synchronous optical networking (SONET) ring.

3. The device of claim 1, where, when defining the one or more logical columns, the processor is further to:

use a width-first n-array tree to traverse the one or more segments based on a connectivity of each of the one or more segments.

4. The device of claim 1, where the processor is further to:

group the components of the test circuit into one more collections including at least one of:
segments,
equipment,
ports, or
connections.

5. The device of claim 4, where the processor is further to:

use a clockwise orientation and a counterclockwise orientation of one or more synchronous optical networking (SONET) rings to prevent the one more collections from crossing.

6. The device of claim 1, where the processor is further to:

group the components into one or more collections;
position at least one piece of equipment within the one or more collections; and
position at least one port on each piece of equipment, of at least one piece of equipment.

7. The device of claim 1, where the graphic rendering of the tested circuit includes one or more lines of code.

8. A method comprising:

receiving, by at least one device, circuit test information that includes information identifying components of a tested circuit and one or more component relationships of the tested circuit;

traversing, by the at least one device, connectivity associated with the received components;

identifying, by the at least one device, one or more segments of the tested circuit;

defining, by the at least one device, one or more logical columns for a graphical display of the circuit test information based on the one or more segments, when defining the one or more logical columns, the method further comprises:

using a width-first n-array tree to traverse the one or more segments based on a connectivity of each of the one or more segments;

laying out, by the at least one device, the one or more segments based on the traversed connectivity and the one or more logical columns; and sending, by the at least one device, a graphic rendering of the tested circuit to another device.

9. The method of claim 8, where each of the one or more segments includes a linear segment or a synchronous optical networking (SONET) ring.

10. The method of claim 8, where the method further includes:

optimizing at least one of the one or more segments in a logical column according to a rule set that includes a rule that advances a segment, of the one or more segments, from a default column to a preceding column.

11. The method of claim 8, where the method further includes:

grouping the components of the test circuit into one more collections including at least one of:
segments,
equipment,
ports, or
connections.

12. The method of claim 11, where the method further includes:

using a clockwise orientation and a counterclockwise orientation of one or more synchronous optical networking (SONET) rings to prevent the one more collections from crossing.

13. The method of claim 8, where the method further includes:

grouping the components into one or more collections;
positioning at least one piece of equipment within the one or more collections; and
positioning at least one port on each piece of equipment, of the at least one piece of equipment.

14. The method of claim 8, where the graphic rendering of the tested circuit includes one or more lines of code.

15. A non-transitory computer-readable medium storing instructions, the instructions comprising:

one or more instructions, which, when executed by a processor, cause the processor to:

receive circuit test information,
the circuit test information including information identifying components of a tested circuit and one or more component relationships of the tested circuit;

traverse connectivity associated with the components;
identify one or more segments of the tested circuit;
define one or more logical columns for a graphical display of the circuit test information based on the one or more segments;

optimize at least one of the one or more segments in a logical column, of the defined one or more logical columns, according to a rule set that includes a rule that advances a segment, of the one or more segments, from a default column to a preceding column;

layout, based on the traversed connectivity, and the one or more logical columns, and the optimized at least one of the one or more segments, the one or more segments; and transmit a graphic rendering of the tested circuit.

16. The medium of claim 15, where each of the one or more segments includes a linear segment or a synchronous optical networking (SONET) ring.

17. The medium of claim 15, where the one or more instructions to define the one or more logical columns include:

one or more instructions to use a width-first n-array tree to traverse the one or more segments based on a connectivity of each of the one or more segments.

18. The medium of claim 15, where the instructions further comprise:

one or more instructions to group the components of the test circuit into one more collections including at least one of:
segments,
equipment,
ports, or
connections.

19. The medium of claim 18, where the instructions further comprise:
   one or more instructions to use a clockwise orientation and a counterclockwise orientation of one or more synchronous optical networking (SONET) rings to prevent the one more collections from crossing.

20. The medium of claim 18, where the instructions further comprise:
   one or more instructions to group the components into one or more collections;
   one or more instructions to position at least one piece of equipment within the one or more collections; and
   one or more instructions to position at least one port on each piece of equipment, of at least one piece of equipment.

* * * * *